United States Patent
Maus et al.

(10) Patent No.: US 11,124,188 B2
(45) Date of Patent: Sep. 21, 2021

(54) ADAPTIVE SPEED CONTROLLER FOR MOTOR VEHICLES AND METHOD FOR ADAPTIVE SPEED CONTROL

(71) Applicant: Ford Global Technologies, LLC, Dearborn, MI (US)

(72) Inventors: Benjamin Maus, Düsseldorf (DE); Guido Weitkus, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 16/413,291

(22) Filed: May 15, 2019

(65) Prior Publication Data
US 2019/0351905 A1   Nov. 21, 2019

(30) Foreign Application Priority Data
May 16, 2018   (DE) .......................... 102018207572.7

(51) Int. Cl.
*B60W 30/14* (2006.01)
*B60Q 9/00* (2006.01)
(Continued)

(52) U.S. Cl.
CPC ............. *B60W 30/143* (2013.01); *B60Q 9/00* (2013.01); *B60W 30/18018* (2013.01);
(Continued)

(58) Field of Classification Search
CPC ............... B60W 30/143; B60W 30/17; B60W 30/18018; B60W 30/18027;
(Continued)

(56) References Cited

U.S. PATENT DOCUMENTS 6,820,709 B1 * 11/2004 Zimmermann ....... B60W 30/16
180/169
9,832,241 B1 * 11/2017 Hayward ................ G01S 19/47
(Continued)

FOREIGN PATENT DOCUMENTS

DE        19958520 A1    6/2001
DE    102005022676 A1   11/2006
(Continued)

OTHER PUBLICATIONS

The All-new 2017 BMW 5 Series Sedan: Performance Redefined (Oct. 17, 2016). Retrieved from https://www.pfaffauto.com/2016/10/17/bmw-5-series/ (26 pages).
(Continued)

*Primary Examiner* — Atul Trivedi
(74) *Attorney, Agent, or Firm* — Frank Lollo; Eversheds Sutherland (US) LLP

(57) ABSTRACT

The invention concerns an adaptive speed controller for a motor vehicle, with a stop-and-go system for an automatic or driver-confirmed restart following a standstill of the motor vehicle because of a vehicle ahead coming to a standstill and starting again, wherein if the motor vehicle comes to a standstill the stop-and-go system then enters a dynamic standstill state ($t_0$ to $t_1$) from which an automatic dynamic restart is possible, and wherein a preset period of time after the motor vehicle has come to a standstill and remains therein, the stop-and-go system enters a confirmation standstill state ($>t_4$) from which an automatic restart is only possible after a driver's confirmation. According to the invention, the confirmation standstill state ($>t_4$) does not immediately follow the first standstill state ($t_0$ to $t_1$), but with the temporal interposition of an intermediate standstill state ($t_1$ to $t_4$), in which an automatic restart is possible, which differs from the dynamic standstill state by different measures such as additional driver instructions, limited accel-
(Continued)

eration or the insertion of crawling phases. As a result of this, the driver is made aware of the automatic restart even after a long time at a standstill.

13 Claims, 2 Drawing Sheets

(51) Int. Cl.
*B60W 30/18* (2012.01)
*B60W 50/16* (2020.01)
*B60W 50/14* (2020.01)

(52) U.S. Cl.
CPC ...... *B60W 30/18063* (2013.01); *B60W 50/14* (2013.01); *B60W 50/16* (2013.01); *B60W 2050/143* (2013.01); *B60W 2050/146* (2013.01); *B60W 2554/4041* (2020.02); *B60W 2554/80* (2020.02)

(58) Field of Classification Search
CPC ... B60W 30/18063; B60W 2554/4041; B60W 2554/80; B60W 2050/143; B60W 2050/146; B60W 2720/10; B60W 2720/106; B60W 50/14; B60W 50/16; B60Q 9/00
USPC .......................................................... 701/93
See application file for complete search history.

(56) References Cited

U.S. PATENT DOCUMENTS

| | | | | |
|---|---|---|---|---|
| 10,696,306 | B1* | 6/2020 | Benisch | B60W 60/001 |
| 10,747,220 | B2* | 8/2020 | Uchida | G05D 1/0088 |
| 2002/0179355 | A1* | 12/2002 | Kurz | B60T 7/22 |
| | | | | 180/169 |
| 2005/0004742 | A1* | 1/2005 | Michi | B60K 31/0008 |
| | | | | 701/93 |
| 2005/0010352 | A1* | 1/2005 | Michi | B60W 30/17 |
| | | | | 701/96 |
| 2005/0038591 | A1* | 2/2005 | Michi | B60W 30/16 |
| | | | | 701/96 |
| 2005/0228569 | A1* | 10/2005 | Michi | B60K 31/0008 |
| | | | | 701/93 |
| 2006/0212207 | A1* | 9/2006 | Sugano | B60W 10/06 |
| | | | | 701/93 |
| 2007/0142994 | A1 | 6/2007 | Boecker et al. | |
| 2009/0299598 | A1* | 12/2009 | Boecker | B60W 30/16 |
| | | | | 701/96 |
| 2011/0071746 | A1 | 3/2011 | O'Connor et al. | |
| 2011/0102166 | A1* | 5/2011 | Filev | B60W 30/02 |
| | | | | 340/435 |
| 2011/0106364 | A1* | 5/2011 | Braeuchle | B60W 30/16 |
| | | | | 701/31.4 |
| 2015/0328985 | A1* | 11/2015 | Kim | A61B 5/18 |
| | | | | 180/272 |
| 2016/0046298 | A1* | 2/2016 | DeRuyck | B60W 50/14 |
| | | | | 340/576 |
| 2017/0001650 | A1* | 1/2017 | Park | B60W 30/06 |
| 2017/0021765 | A1* | 1/2017 | Mori | B60R 1/00 |
| 2017/0096145 | A1* | 4/2017 | Bahn | E05F 15/70 |
| 2017/0305434 | A1* | 10/2017 | Ratnasingam | G06N 20/00 |
| 2018/0024562 | A1* | 1/2018 | Bellaiche | G06T 7/73 |
| | | | | 701/26 |
| 2018/0065664 | A1* | 3/2018 | Watanabe | B62D 15/025 |
| 2018/0127001 | A1* | 5/2018 | Ricci | B60W 40/09 |
| 2020/0017124 | A1* | 1/2020 | Camhi | G06N 20/00 |
| 2020/0031371 | A1* | 1/2020 | Soliman | B60W 50/16 |
| 2020/0192403 | A1* | 6/2020 | Silver | G01S 17/95 |
| 2020/0249674 | A1* | 8/2020 | Dally | G05D 1/0221 |
| 2020/0255026 | A1* | 8/2020 | Katardjiev | G08G 1/096725 |
| 2020/0361483 | A1* | 11/2020 | Yonushonis | B60W 50/14 |
| 2020/0387156 | A1* | 12/2020 | Xu | B60W 10/18 |
| 2021/0001873 | A1* | 1/2021 | Ingrody | B60W 50/10 |

FOREIGN PATENT DOCUMENTS

| | | | | |
|---|---|---|---|---|
| EP | | 1695859 A1 | 8/2006 | |
| EP | | 2028073 A1 | 2/2009 | |
| WO | | 2006/122866 A1 | 11/2006 | |
| WO | WO-2017022195 A1 * | 2/2017 | ........... G06F 3/0486 |

OTHER PUBLICATIONS

Tired of Traffic? New Ford Fusion Offers Technology to Make the Car Stop and Go on Its Own to Ease Stressful Commutes (Apr. 5, 2016). Retrieved from https://media.ford.com/content/fordmedia/fna/us/en/news/2016/04/05/new-ford-fusion-offers-technology-to-ease-stressful-commutes.html (2 pages).

* cited by examiner

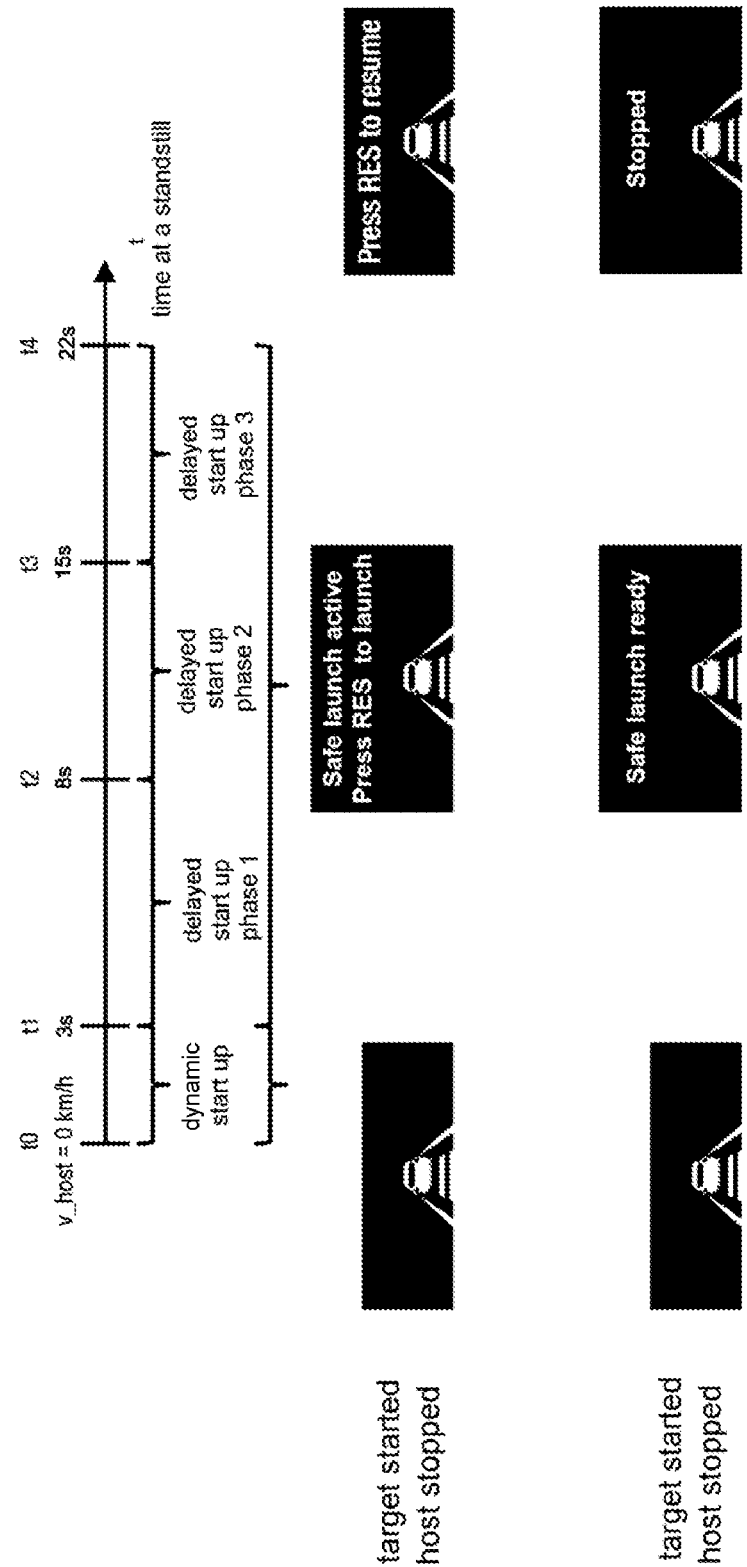

ADAPTIVE SPEED CONTROLLER FOR MOTOR VEHICLES AND METHOD FOR ADAPTIVE SPEED CONTROL

CROSS-REFERENCE TO RELATED APPLICATIONS

This application claims priority to and the benefit of German patent application No. 102018207572.7, filed May 16, 2018, which is hereby incorporated by reference herein in its entirety.

The invention concerns a speed controller for a motor vehicle and a method for adaptive speed control for a motor vehicle according to the preambles of the independent claims.

The speed controller is a so-called adaptive speed controller, also called an adaptive cruise control that involves the distance from a vehicle ahead and the relative speed thereof as additional feedback and control variables and that can automatically accelerate back up to the speed specified by the driver and that is also equipped with a so-called stop-and-go system for additional comfort in dense and stagnant traffic.

The stop-and-go system enables an automatic restart or a driver-confirmed restart by tapping the gas pedal or operating a button or a lever after a brief period with the motor vehicle at a standstill because of a vehicle ahead coming to a standstill and starting again.

If the motor vehicle comes to a standstill in such a way, the stop-and-go system passes into a state that is referred to below as a "dynamic standstill state", from which an automatic "dynamic" restart is possible, i.e. starting that follows the dynamics of the vehicle ahead as much as possible. A preset period of time after the motor vehicle has come to a standstill and remains at a standstill, the stop-and-go system passes into a state that is referred to below as a "confirmation standstill state", from which an automatic restart is only possible after an explicit driver's confirmation.

The invention also concerns a corresponding method for adaptive speed control for a motor vehicle as a function of a distance from a vehicle ahead that is measured with a distance sensor, wherein the motor vehicle automatically follows the vehicle ahead to a standstill and optionally, i.e. if the vehicle ahead starts again, automatically starts again from a standstill produced in such a way as long as the time at a standstill has not exceeded a specified period of time, or automatically starts again after a confirmation by the driver of the motor vehicle, but not if there is no such confirmation.

A speed controller and a method for adaptive speed control according to the preambles of the independent claims are known for example from DE 10 2005 022 676 A1 and DE 199 58 520 A1.

Radar sensors are mainly used in current motor vehicles for measuring distance and relative speed to a vehicle ahead. Lidar systems come under consideration as alternatives, for example.

The confirmation standstill state, from which an automatic restart is only possible following a driver's confirmation, usually starts approx. 3 seconds to at the latest 5 seconds after the start of a standstill phase and it is provided because a driver after said time may no longer be aware that the stop-and-go system is active, and he may therefore no longer be paying attention to the traffic. This can be hazardous for unprotected road users, such as for example crossing pedestrians or cyclists. Owing to the required confirmation, a driver is again aware that the stop-and-go system is active.

It has been shown that in practice the confirmation standstill state is entered very frequently, and the confirmation by the driver that is then necessary significantly reduces the comfort of the stop-and-go function.

The first standstill state, from which an automatic restart is possible, can in principle be extended even beyond approx. 3 seconds if it is ensured that the driver is aware or if for example the vehicle has near-field monitoring available, for example by means of ultrasonic sensors, area radar and/or cameras. Such sensors and the further hardware and software necessary for the detection of unprotected road users are however very expensive.

It is the object of the invention with the known speed controller and method to extend the period of time during which the motor vehicle can start again automatically, without requiring an additional sensing arrangement or exposing other road users to additional risks.

This object is achieved according to the invention by a speed controller and a method with the features of the independent claims.

Advantageous developments of the invention are specified in the dependent claims.

According to the invention, the speed controller does not allow the confirmation standstill state to follow the dynamic standstill state immediately, but—if the motor vehicle is not restarted in the meantime—with the interposition in time of a so-called "intermediate standstill state", in which an automatic restart is always possible.

Starting in said intermediate standstill state is characterized in this case at least by one of the following measures for increasing attention and/or the starting safety:

a) producing at least one starting instruction at the start and/or during starting, wherein the instruction can be of a
   i) visual and/or
   ii) audible and/or
   iii) haptic nature, in particular in the form of an intentionally perceptible starting jolt;

and/or b) starting with a lower acceleration of the motor vehicle than the maximum acceleration provided for a restart from the dynamic standstill state ($t_0$ to $t_1$) or than the current acceleration of the vehicle ahead;

and/or c) starting with at least temporary reduction of the speed compared to the restart from the dynamic standstill state ($t_0$ to $t_1$), in particular in the form of at least one crawling phase.

A "starting jolt" means in particular a brief deceleration of the motor vehicle that is initiated directly after the first vehicle movement and that is haptically perceptible by the driver.

Crawling means in particular travel at up to 1 or 2 km/h for example that is not accelerated or that is only slightly accelerated, and such crawling can typically last 1 or 2 seconds, for example.

For example, with the method according to the invention the motor vehicle is caused to jerk briefly forwards as a haptic starting instruction if the time at a standstill has exceeded the specified period of time and the vehicle ahead starts again. The vehicle is then set into in a slower forward movement than for a dynamic restart (i.e. compared to a restart at a point in time at which the time at a standstill has not yet exceeded the specified period of time $t_1$).

The invention thus allows the driver to intuitively and thus very quickly be aware again that the stop-and-go system is still active and that he must keep the traffic events in mind. However, said measures are carried out only when required and not even for very short standstill intervals that still lie within the dynamic standstill state, so that with the concept according to the invention the driver does not feel loaded or "jaded" by too many warnings and so that the driver still perceives the driving experience as fluid in the event of short standstill intervals.

As a result of the fact that the additional measures are only resorted to from a certain standstill interval, the driver also intuitively recognizes the instruction function thereof, which may not be the case if said additional measures were already to be resorted to for arbitrarily short standstill intervals.

Moreover, a motor vehicle with a short jolt and then a very slow start for example produces an effective warning to other road users not to step onto the road in front of the vehicle, and, if a pedestrian or cyclist should find themselves there already, he can recognize the danger and still easily get to safety. The maximum possible speeds and accelerations of automatic restarting from the intermediate standstill state should also be based thereon.

In a preferred design, the use and the intensity of the measures a) through c) are varied depending on the time that was used until the restart within the intermediate standstill state ($t_1$ to $t_4$), such that with increasing duration of the intermediate standstill state ($t_1$ to $t_4$) until the restart, greater awareness and/or greater starting safety tend(s) to be produced by the measures.

For this purpose, the intermediate standstill state ($t_1$ to $t_4$) can be divided or cascaded into successive phases ($t_1$ to $t_2$, $t_2$ to $t_3$, $t_3$ to $t_4$), in each of which an automatic restart is always still possible, wherein the phases are each different in terms of the use and/or in terms of the intensity of the measures a) through c).

Alternatively, it is however also conceivable, instead of the aforementioned phasing to continuously vary certain characteristic quantitative variables of the measures a) through c), for example the loudness of an audible instruction, the strength of a haptic instruction ("jerking"), the size of the acceleration reduction, the speed reduction and the duration for a crawling stage, the number of crawling stages, etc. according to a function that is dependent on the duration of the standstill until the restart.

In the case of a phasing or cascading, the intermediate standstill state can be divided into two or more phases, wherein for example a first phase ($t_1$ to $t_2$) of the intermediate standstill state can contain at least one starting instruction and a start with a lower acceleration than from the dynamic standstill state ($t_0$ to $t_1$);

a second phase ($t_1$ to $t_2$) of the intermediate standstill state, which is used after the first phase, can contain at least one start with a lower acceleration than in the first phase and can additionally contain a crawling phase; and an optional third phase ($t_3$ to $t_4$) of the intermediate standstill state, which starts after the second phase, can contain at least one additional starting instruction following the crawling phase, in particular a haptically perceptible starting jolt.

However, said division is only an example. The use and the phasing of said measures can be varied in many ways and in principle can also be adapted to the respective driving situation (for example distinguishing stop-and-go situations in road traffic or on freeways, wherein in the latter case surprisingly emerging road users such as cyclists or pedestrians are to be expected more rarely).

In preferred embodiments, the stop-and-go system changes from the dynamic standstill state to the intermediate standstill state between 2 and 4 seconds and preferably 3 seconds after the motor vehicle has come to a standstill and is remaining at a standstill.

In the scope of the invention, as a rule the stop-and-go system changes after a certain time from the intermediate standstill state to the confirmation standstill state, from which an automatic restart is only possible following a driver's confirmation.

In preferred embodiments, the stop-and-go system changes from the first phase of the intermediate standstill state to a second phase of the intermediate standstill state between 6 and 10 seconds after the motor vehicle has come to a standstill.

In preferred embodiments, the stop-and-go system changes from the second phase of the intermediate standstill state to a third phase of the intermediate standstill state between 12 and 18 seconds after the motor vehicle has come to a standstill and changes to the confirmation standstill state between 5 and 10 seconds later.

The starting procedures corresponding to the respective standstill states are thus temporally cascaded, wherein they are increasingly less dynamic than in the dynamic standstill state and increasingly involve the driver and wherein automatic starting is carried out more slowly from state to state.

The driver can end any of said starting procedures at any time by operating the vehicle brake if he finds the situation to be unsafe, for example because another road user is crossing.

In addition, in one design of the invention the driver can revert at any time to a dynamic standstill state that enables dynamic starting for him by operating a control element (for example a button labelled with "RES" or "Resume", a lever or a corresponding touchscreen command panel or another input element) or for example by a voice command.

The cascaded starting procedures improve the chances of the driver recognizing unsafe situations with increasing time at a standstill to the extent that the driver may no longer be aware that the stop-and-go system is active.

In preferred embodiments, the motor vehicle contains a visual display such that depending on whether the stop-and-go system is in the dynamic standstill state or the confirmation standstill state or in one of the intermediate standstill states between them, different symbols are displayed that indicate the corresponding standstill state and optionally also distinguish whether the vehicle ahead is at a standstill is or just starting up.

A description of exemplary embodiments using the drawings follows. In the figures:

FIG. 3 shows a sketch of different status displays in the standstill states shown in FIG. 1.

An adaptive motor vehicle speed controller contains a stop-and-go system for an automatic or driver-confirmed restart after a motor vehicle standstill because of a vehicle ahead coming to a standstill and starting again.

Figure 1:
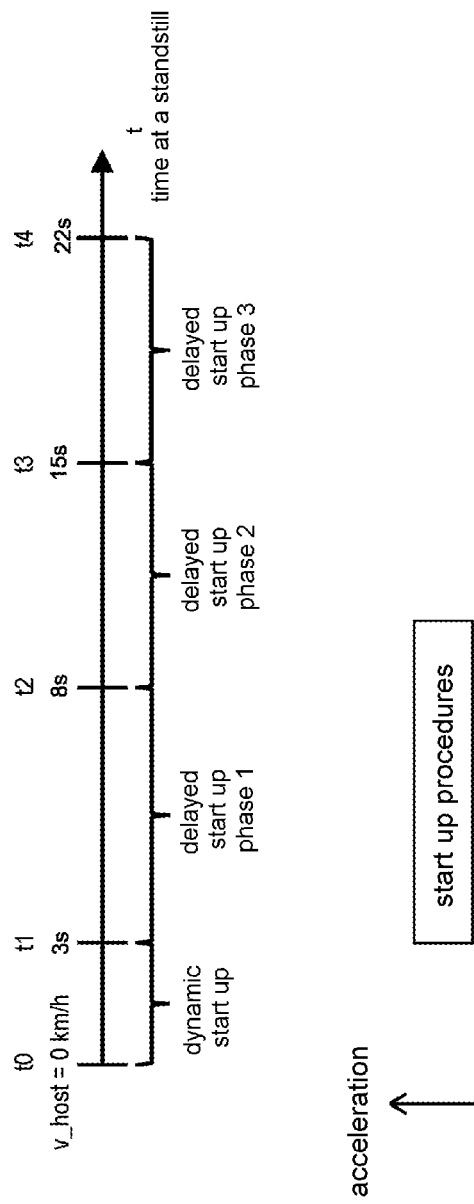
FIG. 1 shows a sketch for illustrating different standstill states of an adaptive speed controller for a motor vehicle.

If the motor vehicle comes to a standstill in such a way, namely at a point in time to in FIG. 1, the stop-and-go system is in a dynamic standstill state, which is so called in view of the possibility of an automatic dynamic start. An automatic restart is also possible from said state if the vehicle ahead (called the target in FIGS. 2 and 3) starts again.

If the vehicle ahead is still not starting and the motor vehicle is still stationary at a point in time $t_1$ of for example 3 seconds after to, the stop-and-go system enters a first phase of a so-called intermediate standstill state that is also referred to as a "delayed starting phase 1" If the vehicle ahead starts again in said state, an automatic restart of the motor vehicle is carried out that includes a starting jolt and that otherwise is carried out with a lower acceleration of the motor vehicle than for dynamic starting.

Figure 2:
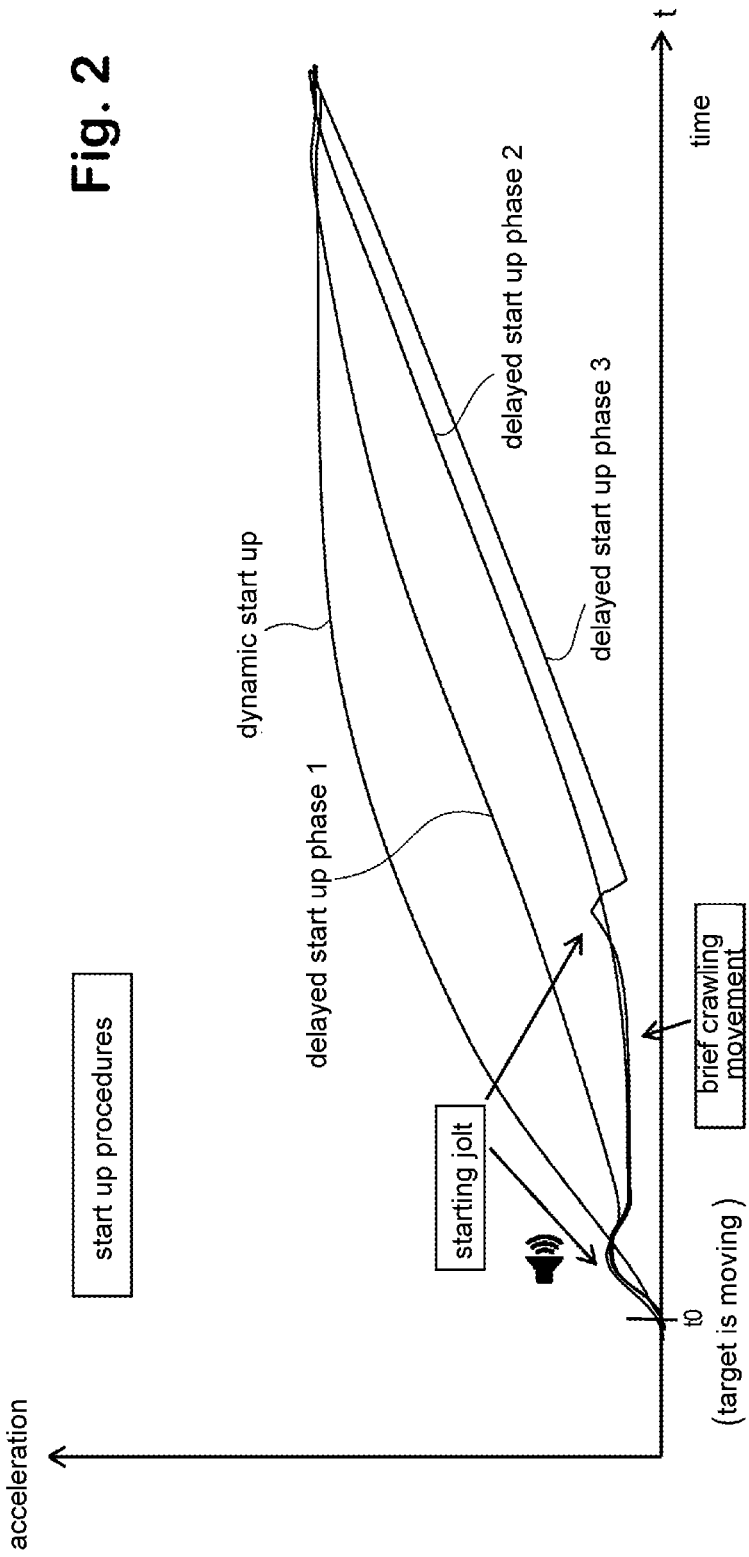
FIG. 2 shows graphs of different starting procedures from the standstill states shown in FIG. 1.

This is illustrated in FIG. 2, which shows the acceleration for an automatic restart from different standstill states as a function of the time elapsed after the point in time to or the time at a standstill t. The starting jolt shows up as a small hump at the start of the acceleration/time curve.

Furthermore, an audible instruction can be given using onboard loudspeakers of the motor vehicle, as illustrated in FIG. 2. If said instruction is given in a temporal relationship to a vehicle jerk, said audible instruction can be a noise that is typical of a vehicle jerk, so that the perceptibility of the vehicle jerk is boosted; however, it can also be a usual instruction tone (for example a "chime" tone signal) or a voice message or similar.

If the vehicle ahead also does not start during phase 1 and the motor vehicle is still stationary at a point in time $t_2$ of for example 8 seconds after to, the stop-and-go system enters a second phase of the intermediate standstill state, also referred to as the "delayed starting phase 2" If the vehicle ahead starts again in said state, an automatic restart of the motor vehicle is carried out that includes a starting jolt and a still lower acceleration than in phase 1 and moreover a short crawling movement, for example a not accelerated or only slightly accelerated movement with up to 1 or 2 km/h, immediately after the starting jolt.

If the vehicle ahead does not even start during phase 2 and the motor vehicle is still stationary at a point in time $t_3$ of for example 15 seconds after to, the stop-and-go system enters a third phase of the intermediate standstill state, also referred to as the "delayed starting phase 3". If the vehicle ahead starts again in said state, an automatic restart of the motor vehicle is carried out that contains a starting jolt, a brief crawling movement and a similarly small acceleration as in phase 2 and moreover at least one further starting jolt immediately after the crawling movement.

If the vehicle ahead does not even start during the phase 3 and the motor vehicle is still stationary at a point in time $t_4$ of for example 22 seconds after to, the stop-and-go system enters a confirmation standstill state, from which an automatic restart is only still possible if the driver confirms this, for example by tapping the gas pedal or operating a button. Alternatively, further staged phases of the intermediate standstill state can also be provided.

The different standstill states can be displayed to the driver on a visual display on the instrument panel by different symbols that illustrate the corresponding standstill state and also optionally distinguish whether the vehicle ahead is at a standstill or just starting up.

As shown in FIG. 3 to the driver of the motor vehicle (called the host in FIGS. 1 and 3) during the dynamic starting phase for example a symbol without a legend for a vehicle ahead is displayed, and this is regardless of whether the vehicle ahead (the target of the speed control) has just stopped or started.

During phases 1 through 3 of the intermediate standstill state, the driver is shown the same symbol, but with a legend indicating readiness for safe restarting when the target has stopped and which when the target has just started up indicates that safe automatic starting is active and that the driver can end said starting procedure and can proceed with normal dynamic starting by pressing a "RES(ume)" button.

This can be desired by the driver if he feels that safe automatic starting is unnecessarily slow.

If the motor vehicle is still stopped after phase 3, the driver is shown the same symbol, but with a legend that indicates the stopped state when the target is stopped and which when the target is starting or no longer present indicates that the driver must press the "RES(ume)" button if he wants to continue his journey.

The invention claimed is:

1. A speed controller for a motor vehicle, the speed controller comprising:
   a stop-and-go system for automatic or driver-confirmed restarting after a standstill of the motor vehicle due to a vehicle ahead of the motor vehicle coming to a standstill and starting again,
   wherein when the motor vehicle comes to the standstill, the stop-and-go system is configured to enter a dynamic restarting state ($t_0$ to $t_1$) from which an automatic dynamic restart is possible,
   wherein after the motor vehicle has come to the standstill and remains therein for a preset period of time, the stop-and-go system is configured to enter a confirmation standstill state ($>t_4$) from which an automatic restart is possible after a driver's confirmation,
   wherein the confirmation standstill state ($>t_4$) does not immediately follow a dynamic standstill state ($t_0$ to $t_1$) but follows with an interposition in time of at least one intermediate standstill state ($t_1$ to $t_4$) in which the automatic restart is possible, and
   wherein the intermediate standstill state ($t_1$ to $t_4$) differs from the dynamic standstill state ($t_0$ to $t_1$) by the following measures configured to increase attentiveness and/or starting safety by:
   a) producing at least one starting instruction at a start and/or during a start up, wherein the at least one starting instruction comprises at least one of a visual, audible, and/or haptic instruction, and one or more of:
   b) starting with a lower acceleration of the motor vehicle than a maximum acceleration that is provided for a restart from the dynamic standstill state ($t_0$ to $t_1$); and
   c) starting with at least a temporary reduction of a speed of the motor vehicle compared to the restart from the dynamic standstill state ($t_0$ to $t_1$) in the form of at least one crawling phase.

2. The speed controller as claimed in claim 1, wherein a use and the intensity of the measures a) through c) are varied depending on a time taken to restart within the intermediate standstill state ($t_1$ to $t_4$) such that with increasing duration of the intermediate standstill state ($t_1$ to $t_4$) until the restart, increased attentiveness and/or starting safety are produced by the measures a) through c).

3. The speed controller as claimed in claim 2, wherein the intermediate standstill state ($t_1$ to $t_4$) is divided or cascaded into successive phases ($t_1$ to $t_2$, $t_2$ to $t_3$, $t_3$ to $t_4$), in each of which an automatic restart is possible, wherein the phases each differ in terms of a use and/or in terms of an intensity of the measures a) through c).

4. The speed controller as claimed in claim 3, wherein the intermediate standstill state is divided or cascaded into two or more phases, wherein:
   a first phase ($t_1$ to $t_2$) of the intermediate standstill state comprises at least one starting instruction and a start up with a lower acceleration than from the dynamic standstill state ($t_0$ to $t_1$); and a second phase ($t_1$ to $t_2$) of the intermediate standstill state, which starts after the first phase, comprises at least one start up with a lower acceleration than in the first phase and additionally comprises the at least one crawling phase, third phase ($t_3$ to $t_4$) of the intermediate standstill state, which starts after the second phase, comprises at least one additional starting instruction following the at least one crawling phase.

5. The speed controller as claimed in claim 4, wherein the stop-and-go system changes from the first phase of the intermediate standstill state ($t_1$ to $t_2$) to the second phase of the intermediate standstill state ($t_2$ to $t_3$) between 6 and 10 seconds after the motor vehicle has come to the standstill.

6. The speed controller as claimed in claim 4, wherein between 12 and 18 seconds after the motor vehicle has come to the standstill, the stop-and-go system changes from the second phase of the intermediate standstill state ($t_2$ to $t_3$) to the third phase of the intermediate standstill state ($t_3$ to $t_4$) and changes to the confirmation standstill state ($>t_4$) between 5 and 10 seconds thereafter.

7. The speed controller as claimed in claim 4, wherein the at least one additional starting instruction comprises a haptically perceptible starting jolt.

8. The speed controller as claimed in claim 2, wherein the stop-and-go system changes from the dynamic standstill state ($t_0$ to $t_1$) to the intermediate standstill state ($t_1$ to $t_4$) between 2 and 4 seconds after the motor vehicle has come to the standstill.

9. The speed controller as claimed in claim 1, wherein the audible starting instruction comprises a sound signal and/or an audible accentuation of a starting jolt that is coordinated in time with said haptic starting jolt.

10. The speed controller as claimed in claim 1, wherein the motor vehicle comprises a visual display configured to display different symbols that indicate a corresponding standstill state and also distinguish whether the vehicle ahead of the motor vehicle is at a standstill or is starting up depending on whether the stop-and-go system is in the dynamic standstill state ($t_0$ to $t_1$) or in the confirmation standstill state ($>t_4$) or in any standstill state ($t_1$ to $t_2$; $t_2$ to $t_3$; $t_3$ to $t_4$) that lie temporally in between.

11. The speed controller as claimed in claim 1, wherein the haptic instruction comprises a starting jolt that is configured to be perceptible by the driver of the motor vehicle.

12. A method for adaptive speed control for a motor vehicle as a function of a distance from a vehicle ahead of the motor vehicle measured with a distance sensor, wherein the motor vehicle is configured to automatically follows the vehicle ahead of the motor vehicle to a standstill and (i) automatically start again from the standstill if a time of the standstill (t) has not exceeded a specified period of time ($t_1-t_0$) or (ii) automatically starts again following confirmation by a driver of the motor vehicle, the method comprising:

taking, if the time of the standstill (t) has exceeded the specified period of time ($t_1-t_0$) and the vehicle ahead of the motor vehicle restarts, in an intermediate standstill state ($t_1$ to $t_4$), in which an automatic restart is carried out without confirmation by the driver, the following measures that are configured to increase attentiveness and/or starting safety, which differ from measures for an automatic restart before the specified period of time:
a) producing at least one starting instruction at a start and/or during a start up, wherein the at least one starting instruction comprises a visual, audible, and/or haptic instruction, and one or more of:
b) starting with a lower acceleration of the motor vehicle than a maximum acceleration of the motor vehicle that is provided for a restart from a dynamic standstill state ($t_0$ to $t_1$); and
c) starting with at least a temporary reduction of a speed relative to the restart from the dynamic standstill state in the form of one or more crawling phases.

13. The method of claim 12, wherein the haptic instruction comprises a starting jolt that is configured to be perceptible by the driver of the motor vehicle.

* * * * *